United States Patent [19]

Taylor

[11] 3,985,743
[45] Oct. 12, 1976

[54] PREPARATION OF THIOCARBAMYLSULFENAMIDES

[75] Inventor: Ray D. Taylor, Brecksville, Ohio

[73] Assignee: The B. F. Goodrich Company, Akron, Ohio

[22] Filed: Nov. 25, 1974

[21] Appl. No.: 526,591

Related U.S. Application Data

[63] Continuation-in-part of Ser. No. 254,532, May 18, 1972, abandoned.

[52] U.S. Cl. .......................... 260/246 B; 260/239 R; 260/247.1 R; 260/247.1 T; 260/293.63; 260/293.71; 260/293.85; 260/326.83; 260/464; 260/465 E; 260/465.5 R; 260/567
[51] Int. Cl.$^2$ ........................................ C07C 155/04
[58] Field of Search ............... 260/246 B, 247.1 T, 260/247.1 R, 293.85, 326.83, 551 S, 567, 465 E, 465.5 R, 464, 293.63, 293.71, 239 R

[56] References Cited
UNITED STATES PATENTS

| | | |
|---|---|---|
| 2,318,482 | 5/1943 | Hanslick .......................... 260/567 |
| 2,333,468 | 11/1943 | Cooper .......................... 260/247.1 T |
| 2,386,457 | 10/1945 | Hanslick ....................... 260/247.1 T |
| 2,421,352 | 5/1947 | Paul et al. ........................... 260/567 |
| 2,424,921 | 7/1947 | Smith et al. ..................... 260/551 S |
| 3,417,086 | 12/1968 | Smith et al. .................. 260/247.1 T |

FOREIGN PATENTS OR APPLICATIONS

| | | |
|---|---|---|
| 658,080 | 2/1963 | Canada .............................. 260/567 |

OTHER PUBLICATIONS

Smith et al. III, J. Org. Chem. 14, (1948) pp. 935–945.
Morrison et al., *Organic Chemistry*, 2nd Ed., (1966), p. 748.

Primary Examiner—Lorraine A. Weinberger
Assistant Examiner—Michael Shippen
Attorney, Agent, or Firm—Alan A. Csontos

[57] ABSTRACT

Thiocarbamylsulfenamides are prepared by the reaction of an amine and monohaloamine with carbon disulfide in the presence of a base. The compounds have particular utility as accelerators in the vulcanization of unsaturated polymers.

10 Claims, No Drawings

PREPARATION OF THIOCARBAMYLSULFENAMIDES

REFERENCE TO RELATED APPLICATION

This application is a continuation-in-part of application Ser. No. 254,532 filed on May 18, 1972 now abandoned.

BACKGROUND OF THE INVENTION

Several processes for the preparation of thiocarbamylsulfenamides are disclosed in *Journal of Organic Chemistry*, Vol. 14, (1949), Page 935, by G.E.P. Smith et al. A dithiocarbamate metal salt is used as a starting material in each process. A widely used process is the reaction of a dithiocarbamate metal salt with an amine in the presence of an oxidizing agent. The agents normally used are iodine in a potassium iodide solution, or sodium hypochlorite, NaOCl. If iodine is used, an excess is required to make up for losses due to iodate formation. If NaOCl is used, molar excesses of amine to dithiocarbamate are required to obtain high yields.

SUMMARY OF THE INVENTION

Thiocarbamylsulfenamides are prepared by the reaction of an amine and monohaloamine with carbon disulfide in the presence of a base. Yields of over 50% and greater than 90% are readily obtained even when employing little or no excess of reactants.

DETAILED DESCRIPTION

The thiocarbamylsulfenamides prepared by the method of this invention have the formula

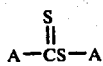

wherein A is selected from the group consisting of

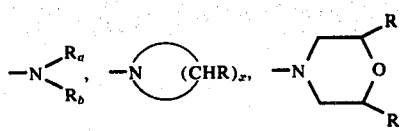

and mixtures thereof, where $R_a$ and $R_b$ are selected from the group consisting of hydrogen, an alkyl radical containing 1 to 24 carbon atoms, a cyanoalkyl radical containing 2 to 12 carbon atoms, an alkoxyalkyl radical containing 2 to 12 carbon atoms, an alkenyl radical containing 2 to 18 carbon atoms, all wherein the alkyl structure can contain secondary or tertiary carbon atom structures; a cycloalkyl radical containing 4 to 8 carbon atoms in the ring and additionally may have 1 to 4 carbon atom alkyl substituents thereon; phenyl; an alkaryl or aralkyl radical containing 7 to 18 carbon atoms in the radical; and where R is hydrogen or an alkyl radical containing 1 to 2 carbon atoms and $x = 4$ to 7.

Examples of such compounds are thiocarbamylsulfenamide and the derivatives thereof as N,N-dimethyl thiocarbamylsulfenamide; N-methyl-N'-ethyl thiocarbamylsulfenamide; N,N,N',N'-tetramethyl thiocarbamylsulfenamide; N,N,N',N'-tetraethyl thiocarbamylsulfenamide; N,N,N',N'-tetrabutyl thiocarbamylsulfenamide; N-methyl-N',N'-diisopropyl thiocarbamylsulfenamide; N-octyl-N'-butyl thiocarbamylsulfenamide; N,N-didodecyl thiocarbamylsulfenamide; N,N-dioctadecyl thiocarbamylsulfenamide; N-isopropyl-N',N'-dicyclobutyl thiocarbamylsulfenamide; N-methyl-N-phenyl-N',N'-dimethyl thiocarbamylsulfenamide; N,N-dimethyl-N'-tetramethylene thiocarbamylsulfenamide; N'-oxydiethylene thiocarbamylsulfenamide; N,N-dimethyl-N'-oxydiethylene thiocarbamylsulfenamide; N,N-di-(α-cyanopropyl) thiocarbamylsulfenamide; N,N,N',N'-tetramethoxyethyl thiocarbamylsulfenamide; N,N-diallyl-N',N'-dimethyl thiocarbamylsulfenamide; N,N-dicyclohexyl-N',N'-dibutyl thiocarbamylsulfenamide; N-cyclooctyl-N',N'-(1,3-dimethylhexyl) thiocarbamylsulfenamide; N-benzyl-N',N'-diethyl thiocarbamylsulfenamide; N-pentamethylene-N',N'-dipropyl thiocarbamylsulfenamide; N,N'-di(tetramethylene) thiocarbamylsulfenamide; N,N'-di-(pentamethylene) thiocarbamylsulfenamide; N,N'-di-(hexamethylene) thiocarbamylsulfenamide; N-pentamethylene-N'-oxydiethylene thiocarbamylsulfenamide; N-heptamethylene-N'-oxydiethylene thiocarbamylsulfenamide; N,N'-di-(oxydiethylene) thiocarbamylsulfenamide; N-oxydiethylene-N'-2,6-dimethyloxydiethylene thiocarbamylsulfenamide; N,N'-di-(2,6-dimethyloxydiethylene) thiocarbamylsulfenamide; and N-2,6-dimethyloxydiethylene-N'-ethyl thiocarbamylsulfenamide.

The thiocarbamylsulfenamides are prepared in a process comprising the reaction of an amine and a monohaloamine with carbon disulfide.

The monohaloamines have the formula X – A, wherein X is —Cl, —Br, or —I, and A is defined as above. Examples of monohaloamines are monochloroamine, monobromoamine, methyl-chloroamine, ethyl-chloroamine, ethyl-iodoamine, t-butyl-chloroamine, hexyl-chloroamine, dodecyl-chloroamine, dimethyl-chloroamine, dimethyl-bromoamine, diethyl-chloroamine, ethyl-propyl-chloroamine, diisopropyl-chloroamine, ethyl-hexyl-chloroamine, dioctyl-chloroamine, dioctyl-bromoamine, didodecyl-chloroamine, dioctadecyl-chloroamine, diallyl-chloroamine, α-cyanopropyl-chloroamine, di-methoxyethyl-chloroamine, phenyl-chloroamine, benzyl-chloroamine, benzyl-bromoamine, 3,5-diethylbenzyl-chloroamine, cyclopentyl-chloroamine, cyclohexyl-chloroamine, dicyclobutylchloroamine, dicyclohexyl-bromoamine, tetramethyleneamine chloride, heptamethyleneamine chloride, hexamethyleneamine chloride, hexamethyleneamine iodide, 4-methyl-hexamethyleneamine chloride, oxydiethyleneamine chloride, 2,6-dimethyloxydiethyleneamine chloride, and the like.

The monochloroamines are preferred. They are readily prepared by reacting a primary or secondary amine with a chlorinating agent such as sodium hypochlorite, NaOCl. This can be done in situ prior to the reaction of the amine and the chloroamine with the carbon disulfide. Though all further reference in the specification will be made to monochloroamines as used in the process, it is understood that monobromoamines and monoiodoamines may also be used.

More preferred are those monochloroamines wherein when A is —NR$_a$R$_b$, R$_a$ is hydrogen or the same as R$_b$, and R$_b$ is an alkyl radical containing 1 to 24 carbon atoms or a cycloalkyl radical containing 4 to 8 carbon atoms in the ring, and when A is

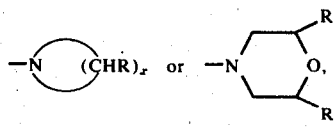

$x$ is 4 to 7, and R is hydrogen or a methyl radical. Examples of such compounds are methyl-chloroamine, ethyl-chloroamine, t-butyl-chloroamine, hexyl-chloroamine, diemthyl-chloroamine, diethyl-chloroamine, ethyl-propyl-chloroamine, diisopropylchloroamine, disecbutyl-chloroamine, dihexyl-chloroamine, hexyl-octyl-chloroamine, diisooctyl-chloroamine, didecylchloroamine, methyl-dodecyl-chloroamine, ditetradecyl-chloroamine, dioctadecyl-chloroamine, cyclobutyl-chloroamine, cyclohexyl-chloroamine, dicyclopentyl-chloroamine, dicyclohexyl-chloroamine, di-(4-methyl-cyclohexyl)-chloroamine, tetramethyleneamine chloride, pentamethyleneamine chloride, hexamethyleneamine chloride, oxydiethyleneamine chloride, 2,6-dimethyloxydiethyleneamine chloride, and the like.

The amines employed have the formula H—A, wherein A is defined as above. Examples of such amines would be those broadly disclosed haloamines as listed above except for the replacement of the chlorine atom with a hydrogen atom. More preferred are those amines wherein, when A is —$NR_aR_b$, $R_a$ is hydrogen or the same as $R_b$ and $R_b$ is an alkyl radical containing 1 to 24 carbon atoms; and when A is

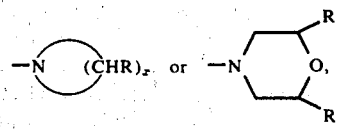

wherein $x = 4$ to 7, and R is hydrogen or a methyl radical. Examples of the more preferred amines are methylamine, ethylamine, n-butylamine, hexylamine, dodecylamine, dimethylamine, diethylamine, ethylpropylamine, dibutylamine, dihexylamine, dioctylamine, didoceylamine, dioctadecylamine, tetramethylamine, pentamethyleneamine, hexamethyleneamine, oxydiethyleneamine, 2,6-dimethyloxydiethyleneamine, and the like.

The base can be an alkali metal hydroxide such as sodium hydroxide, potassium hydroxide, and the like; an alkali metal alcoholate wherein the alcohol is an aliphatic alcohol containing 1 to 10 carbon atoms such as sodium methoxide, sodium ethoxide, potassium butoxide, and the like; or the alkali metal salt of a weak acid such as organic acids containing 1 to about 8 carbon atoms like formic acid, acetic acid, chloroacetic acid, citric acid, levulinic acid, benzoic acid and salicylic acid; boric acid, phosphoric acid, carbonic acid, and the like. Examples of alkali metal salts of weak acids are sodium acetate, potassium benzoate, sodium borate, sodium phosphate, sodium carbonate, and the like. Excellent results were obtained when using an alkali metal hydroxide such as sodium hydroxide as the base.

The amine and a monochloroamine are reacted with carbon disulfide in the presence of a base to form the thiocarbamylsulfenamide. The novel process is particularly adapted to the preparation of unsymmetrical thiocarbamylsulfenamides, although symmetrical thiocarbamylsulfenamides are also readily prepared. A reason for this is that there is a tendency for the less bulky compound, i.e. the amine or chloroamine having the less bulky $R_a$ and $R_b$ radicals, to attach itself to the carbon atom nitrogen of the thiocarbamylsulfenamide. If the radicals on the two compounds are quite similar, a mixture of both symmetrical and unsymmetrical thiocarbamylsulfenamides can be obtained. Of course, if the radicals are the same, symmetrical compound is produced.

The reaction can be conducted as a slurry in water. The amine is more or less soluble in water, depending on the $R_a$ and $R_b$ radicals. The chloroamine, the carbon disulfide and the base can be added to the amine/water and the mixture agitated (the chloroamine, the carbon disulfide, and the thiocarbamylsulfenamide product are insoluble in water). When agitation stops, the mixture separates and the product phase is separated out. The thiocarbamylsulfenamide can be isolated by evaporating off any unreacted chloroamine and carbon disulfide under reduced pressure.

A more preferred variation is to conduct the reaction in an aqueous/non-aqueous medium. In this manner, higher yields and more pure products can be obtained. The medium consists of water and an organic solvent, preferably a chlorinated organic solvent such a methylene chloride, carbon tetrachloride, chloroform, ethylenedichloride, 1,1,1-trichloroethane, 1,1,2-trichloroethane, chlorobenzene, 1,1,2-trichloro, trifluoroethane and the like. The monochloroamine, the carbon disulfide and the thiocarbamylsulfenamide are all soluble in the non-aqueous phase.

The temperature of the reaction ranges from near the freezing point of the mixture, about −20° C., to near the boiling point of the mixture, about 80 ° – 100° C. A more preferred range is from about −10° C. to about 40° C. Reaction times are from about 0.2 hours to about 2 hours.

The amine and the monochloroamine can both be used in a molar excess of the amount of the carbon disulfide present. However, yields of over 50% and in excess of 90% based on the theoretical yield are readily obtained using about 1 mol of monochloroamine and one mol of amine to every 1 mol of carbon disulfide present. By-products of the reaction are sodium chloride and water (if sodium hydroxide is used).

The reaction is conducted with agitation. After the reaction, the mixture is allowed to separate and the non-aqueous phase is decanted off and dried down to isolate the product. The thiocarbamylsulfenamides are usually crystalline materials but some are liquids at room temperatures. The product can be dissolved in an alcohol such as methanol and ethanol or in an alkane such as hexane, and then precipitated out by cooling. Yields after recrystallization are from about 50 to about 90% by weight of the theoretical yield. The compounds can be characterized by melting point, infrared (IR) spectra, nuclear magnetic resonance (NMR), and carbon/hydrogen/nitrogen analysis.

The thiocarbamylsulfenamides have particular utility as accelerators in the vulcanization of unsaturated polymers. Examples of such polymers are natural rubber; diene rubbers such as polybutadiene, polyisoprene, and the like; ethylenepropylene-diene polymers where the diene is 1,4-hexadiene, dicyclopentadiene, ethylidene norbornene, and the like; diene/styrene polymers and diene/acrylonitrile polymers; and polymers in general that have carbon-carbon unsaturation capable of being crosslinked with sulfur.

The compounds are normally used in combination with a vulcanizing agent such as sulfur or a primary sulfur donor such as the thiuram disulfides. They are added to the polymer using internal mixers such as banburys or using two-roll mills and the like. The compounds are used in levels from about 0.05 part to about 10 parts by weight based upon 100 parts by weight of the polymer, and more preferably, from about 0.3 part to about 5 parts by weight.

The polymers typically contain other ingredients which are added in a manner similar as the curing agents. These ingredients are fillers such as carbon blacks, clays, silicas, carbonates, and the like; lubricants and plasticizers; antioxidants and stabilizers; and the like.

The following examples serve to more fully illustrate the invention.

EXAMPLE I

N,N,N',N'-tetramethylthiocarbamylsulfenamide was prepared by reacting about 0.22 mole of dimethylamine and about 0.22 mole of dimethylchloroamine with 0.2 mole of carbon disulfide in the presence of about 0.32 mole of sodium hydroxide and in a mixture of carbon tetrachloride and water.

The chloroamine was prepared in situ prior to use. 150 milliliters of carbon tetrachloride, $CCl_4$, was added to a reactor vessel equipped for agitation. 79.2 grams of a solution of dimethylamine at 25% by weight in water (0.44 mole) was added and the mixture cooled to 10° C. Then 100 milliliters of a solution of NaOCl at 14% by weight in water (0.22 mole) was added, and the mixture agitated for 15 minutes while maintaining the temperature at 10° C. The reaction mixture contained about 0.22 mole each of dimethylamine and dimethylchloroamine and about 0.22 mole of NaOH by-product.

To the reaction mix, 4.0 grams (0.1 mole) of solid NaOH was added, followed by 15.2 grams (0.2 mole) of carbon disulfide. The mixture was agitated for 15 minutes while keeping the temperature at 6° to 12° C. The final pH of the aqueous phase was about 10.

The mixture was allowed to settle and the nonaqueous phase separated out and filtered to remove some disulfide by-product. The $CCl_4$ was then evaporated off by heating under reduced pressure. A white crystalline solid having a melting point of 49° C. was obtained in the amount of 23.7 grams. This reflects a yield of 72% by weight based on theoretical. The N,N,N',N'-tetramethylthiocarbamylsulfenamide was identified through its infrared (IR) spectrum.

EXAMPLE II

N,N'-di(oxydiethylene)thiocarbamylsulfenamide was prepared by reacting about 0.2 mole of morpholine and about 0.2 mole of chloromorpholine with 0.2 mole of carbon disulfide in the presence of about 0.2 mole of NaOH and in a medium of water and chloroform.

34.8 grams (0.4 mole) of morpholine was added to 50 milliliters of chloroform and the solution cooled to 0° C. Then 110 grams of a solution of NaOCl at 13% by weight in water (0.2 mole) was added, and the mixture stirred for 10 minutes while kept about 10° C.

15.2 grams (0.2 mole) of carbon disulfide was then added and the mixture stirred for 10 minutes while at 5° – 15° C. The mixture became quite thick and an additional 50 milliliters of chloroform was added. After stirring for 15 minutes more, the mixture was allowed to settle and the non-aqueous phase separated out. The chloroform was evaporated off by heating under reduced pressure. The pale yellow crystalline solids obtained were slurried in methanol which extracted disulfide by-product. The slurry was filtered and dried yielding 45.2 grams of white crystals having a melting point of 128° – 134° C. This reflects a yield of 92% by weight based on the theoretical yield.

EXAMPLE III

N,N-dimethyl-N',N'-dicyclohexylthiocarbamylsulfenamide was prepared. The bulkier dicyclohexyl grouping was directed to the sulfur nitrogen.

100 milliliters of carbon tetrachloride, 39.6 grams of a solution of dimethylamine at 25% by weight in water (0.22 mole), and 36.2 grams (0.2 mole) of dicyclohexylamine were placed in a reactor vessel and the mixture cooled to 10° C. 114 milliliters of a solution of NaOCl at 14% by weight in water (0.23 mole) was added and the mixture stirred for 15 minutes at 10° – 15° C. 200 milliliters of water containing 25 grams of $NaHCO_3$ and 11 grams $Na_2CO_3$ was then added as a buffer solution.

The mixture was warmed to 20° C. and 15.2 grams (0.2 mole) of carbon disulfide was added with stirring. The mixture was stirred for 40 minutes while keeping the temperature at 32° – 35° C. The mixture was allowed to settle and the non-aqueous phase was separated out and filtered.

The $CCl_4$ was evaporated off leaving 61 grams of a thick liquid. 150 milliliters of methanol were added and the liquid first dissolved then a solid precipitated out. The methanol slurry was cooled to −10° C. and filtered. The solids removed were dried and 44.1 grams of a white crystal obtained which had a melting point of 80° – 82° C. This reflects a yield of 77% of theoretical.

The N,N-dimethyl-N',N'-dicyclohexylthiocarbamylsulfenamide was identified through its IR spectrum. The calculated element weights for the formula $C_{15}H_{28}N_2S_2$ were 9.32% N, 60.0% C, and 9.32% H. Analytical values found were 9.34% N, 59.8% C, and 9.60% H.

EXAMPLE IV

N-oxydiethylene-N',N'-dicyclohexylthiocarbamyl sulfenamide was prepared following the procedure of Example III. Again, the bulkier dicyclohexyl grouping was directed to the sulfur nitrogen.

100 milliliters of chloroform, 17.4 grams (0.2 mole) of morpholine, and 36.2 grams (0.2 mole) of dicyclohexylamine were placed in a reactor vessel, cooled to 0° C., and then 110 grams of a solution of NaOCl at 13% by weight in water (0.2 mole) was added. The mixture was stirred for 10 minutes and 15.2 grams (0.2 mole) of carbon disulfide added. An additional 100 milliliters of chloroform was added. After 20 more minutes of stirring while maintaining the temperature at 30° – 35° C., the mixture was allowed to settle. The non-aqueous phase was separated and the chloroform evaporated off. A light yellow solid was obtained which was slurried in 100 milliliters of methanol, cooled to −10° C., filtered, and the filtrate washed with an additional 25 milliliters of MeOH to yield 51.1 grams of a white crystalline solid. Water was added to the methanol solution which yielded an additional 1.5 grams of the crystals. Total weight was 52.6 grams, reflecting a yield of 77% based on theoretical. The IR spectrum and carbon/hydrogen/nitrogen element weight analysis of the compound was consistent with N-oxydiethylene-N',N'-dicyclohexylthiocarbamylsulfenamide. Calculated weight percents for the formula $C_{17}H_{30}N_2S_2O$ were 59.6% C, 8.2% N, and 8.8% H. Test values were 59.5% C, 8.1% N, and 9.1% H.

EXAMPLE V

N-oxydiethylene-N',N'-diisobutylthiocarbamylsulfenamide was prepared.

100 milliliters of chloroform, 17.4 grams (0.2 mole) of morpholine, and 25.8 grams (0.2 mole) of diisobutylamine were placed in a reactor vessel, cooled to 20° C. and 115 grams of a solution of NaOCl at 13% by weight in water (0.2 mole) added. The mixture was stirred for 10 minutes at a temperature of about 20° C. Then 15.2 grams (0.2 mole) of carbon disulfide was added and the mixture stirred for 35 minutes while maintaining the temperature at about 35° C. The mixture settled and the non-aqueous phase was separated out and dried by evaporation of the chloroform to a yellow solid. The solid was dissolved in methanol and the white crystals which precipitated out on cooling were collected. The weight obtained was 37 grams, reflecting a yield of 64% of theoretical. The melting point of the crystals was 94° – 97° C. The IR spectrum and element weight analysis was consistent with the proposed structure.

The experiment was repeated using dimethylamine, tetramethyleneamine, and hexamethyleneamine, respectively, in place of diisobutylamine. The morpholine was directed to the N' position. The compounds prepared were N,N-dimethyl-N'-oxydiethylene-thiocarbamylsulfenamide (melting point of 75° – 78° C.); N-tetramethylene-N'-oxydiethylenethiocarbamylsulfenamide (melting point of 86° – 88° C.); and N-hexamethylene-N'-oxydiethylene-thiocarbamylsulfenamide (melting point of 97° – 100° C.).

Using the procedures as given in Examples I to V, the following additional compounds were prepared:

|  | M.P. (° C.)[1] | % Yield[2] |
|---|---|---|
| N,N'-di-(3,5-dimethyl-oxydiethylene)thiocarbamylsulfenamide | 117 | 41 |
| N-pentamethylene-N'-oxydiethylene-thiocarbamylsulfenamide | 74–77 | 50 |
| N,N-dimethyl-N',N'-diisopropyl-thiocarbamylsulfenamide | 52–53 | 50 |
| N-oxydiethylene-N',N'-diisopropyl-thiocarbamylsulfenamide | 67–69 | 73 |
| N-oxydiethylene-N',N'-di(sec-butyl)thiocarbamylsulfenamide | 34–35 | 43 |
| N-oxydiethylene-N',N'-di(2-ethylhexyl)thiocarbamylsulfenamide | liquid | 91 |
| N-oxydiethylene-N'-(2,2,6,6-tetramethyl)-pentamethylene-thiocarbamylsulfenamide | 116–118 | 41 |
| N-hexamethylene-N',N'-dicyclohexyl-thiocarbamylsulfenamide | 88–89 | 40 |
| N-(3,5-dimethyl)oxydiethylene-N',N'-dicyclohexyl-thiocarbamylsulfenamide | liquid | 100 |

[1]crystalline melting point
[2]percent of theoretical yield, after recrystallization

EXAMPLE VI

The process of the present invention is unique in that a broad range of thiocarbamylsulfenamide compounds can be prepared in high yields without the need of using an excess of amine reactant. Two similar processes are known to the art (see Smith et al, Journal of Organic Chemistry, Vol. 14 (1949) page 935).

In one process (process II on page 938 of the above-mentioned article), a solution of a dithiocarbamate salt is first prepared, which is then added, along with a solution of sodium hypochlorite, to an amine (ammonia) solution. A large excess of amine is taught to be necessary to the process. The claimed process differs from the art process in two respects: (1) a dithiocarbamate salt is not first prepared prior to contact with the amine, and (2) the use of an excess of amine reactant is not necessary to obtain high yields of thiocarbamylsulfenamide product.

In the second process (process III on page 938 of the article), a preformed dithiocarbamate salt is reacted with a monochloroamine. The claimed process differs from this art process in two respects: (1) a dithiocarbamate salt is not first prepared, and (2) the claimed process can be used to prepare thiocarbamylsulfenamides which cannot be made using the art process; i.e. by the reaction of a preformed dithiocarbamate and a monochloroamine. The following experiments demonstrate the latter point.

A series of experiments were run to demonstrate the preparation of thiocarbamylsulfenamide compounds following (A) the method of first preparing the dithiocarbamate salt and then reacting the salt with a haloamine, and (B) the method of reacting an amine, a monohaloamine, and carbon disulfide in the presence of a base as taught in the present invention. As a large excess of amine is not used in Smith's process III, the comparison between the claimed process and the art process is made on about an equimolar level of amine to other reactant. The experiments are designed to show that the two processes are not equal in their ability to prepare product.

Following method (A), three experiments were run. In experiment A-1, 45 grams of a 25% by weight solution of dimethylamine in water (0.25 mole) was placed in a reactor vessel, followed by 10 grams of NaOH dissolved in 50 milliliters of water. The mix was cooled to about 10° C., and 19 grams of carbon disulfide was added, maintaining the temperature at about 10° C. The reaction product was the sodium dimethyl dithiocarbamate salt. A solution of N-chlorodimethylamine was then prepared by mixing 143 grams of a 13% by weight solution of NaOCl (0.25 mole) in water (which was at 0° C.) with 45 grams of a 25% by weight solution of dimethylamine in water (0.25 mole). The product formed was N-chlorodimethyl amine. The reaction solution containing the sodium dithiocarbamate salt was then admixed with the reaction suspension containing the N-chlorodimethylamine while maintaining the temperature at about 0° C. The mixture was stirred for 1.5 hours while the temperature rose to about 18° C. 3.9 grams of a solid was filtered out of the mixture and washed with water and dried at 50° C. in a vacuum oven for 0.5 hour. The recovered product was identified by its infrared spectrum to be predominantly tetramethyl thiuram disulfide and not the desired tetramethyl thiocarbamylsulfenamide. The recovered product had a melting point of 134° to 137° C., whereas tetramethylthiuram disulfide has a melting point of 146° to 148° C. and tetramethyl thiocarbamylsulfenamide has a melting point of 50° to 52° C.

In experiment A-2, conducted following the procedure outlined above, 21.8 grams of morpholine (0.25 mole) and 143 grams of a 13% by weight solution of NaOCl in water (0.25 mole) was used to prepare the N-chloromorpholine compound. A sodium oxydiethylene dithiocarbamate salt was prepared by reacting 21.8 grams of morpholine with 19.0 grams (0.25 mole) of $CS_2$ and 10.0 grams of NaOH dissolved in 100 milliliters of water. The dithiocarbamate salt was added to the N-chloromorpholine suspension, and the mixture stirred. The temperature raised from 0° C. to room temperature. A yellow resinous solid was filtered out of solution weighing 11.6 grams. This solid product did not have the infrared spectra of the desired dimorpholinothiocarbamylsulfenamide compound.

In experiment A-3, following the procedure outlined in experiment A-1, N-chlorodicyclohexyl amine was prepared by recting 45.3 grams (0.2 mole) of dicyclohexyl amine with 143 grams of a solution of NaOCl at 13% by weight in water (0.25 mole). A sodium dimethyl dithiocarbamate salt was prepared by reacting 45 grams of a dimethyl amine solution at 25% by weight in water (0.25 mole) with 10 grams of NaOH dissolved in 80 milliliters of water and 19.0 grams of carbon disulfide (0.25 mole). The dithiocarbamate salt was added to the N-chlorodicyclohexylamine suspension, and the mixture was stirred for 1.0 hour and allowed to warm up from 0° C. to room temperature. The organic layer was separated from the aqueous layer and dried down to yield a brown viscous oil. On adding hexane to this oil, a white precipitate formed which was isolated and dried to obtain a white solid having a melting point of over 300° C. The hexane solution was dried down to yield brown crystals which were washed with hexane and dried. The crystals had a melting point of over 260° C. The infrared spectra of either of these solids was not the infrared spectra of the desired dimethyl-dicyclohexyl thiocarbamylsulfenamide which has a melting point of about 82° C.

Following the procedure of method (B), the method of the present invention, three experiments were run. In experiment B-1, 79.2 grams of a solution of dimethyl amine at 25% by weight in water (0.44 mole) was added to a reactor vessel containing 150 milliliters of carbon tetrachloride, and the mix cooled to about 10° C. 100 milliliters of a solution of NaOCl at 14% by weight in water (0.22 mole) was added to the mix, and the mix stirred while maintaining the temperature at about 10° C. The reaction product was about 0.22 mole of N-chlorodimethylamine with about 0.22 mole of unreacted dimethylamine. To this mix was added 4.0 grams (0.1 mole) of NaOH and 15.2 grams (0.2 mole) of carbon disulfide, keeping the temperature at about 6° to 12° C. The organic phase was separated off and dried to yield 23.7 grams of a white crystalline product having a melting point of 49° C. The product had the infrared spectra of the desired tetramethyl thiocarbamylsulfenamide.

In experiment B-2, following the procedure outlined above, 34.8 grams of morpholine (0.4 mole), 110 grams of a solution of NaOCl at 13% by weight in water (0.2 mole) and 100 milliliters of chloroform were admixed to prepare about 0.2 mole of N-chloromorpholine with about 0.2 mole of morpholine remaining unreacted. 15.2 grams (0.2 mole) of carbon disulfide was added and 45.2 grams of a white crystalline solid was obtained which had a melting point of 128° C. to 134° C. The product had the infrared spectra of the desired N,N'-dimorpholinothiocarbamylsulfenamide.

In experiment B-3, following the procedure given in experiment B-1 above, 44.1 grams of a white crystalline solid having a melting point of 80° C. to 82° C. which had the infrared spectra of the desired N,N-dimethyl-N,N'-dicyclohexyl thiocarbamylsulfenamide was prepared. The reaction was as follows: 39.6 grams of a solution of dimethylamine at 25% by weight in water (0.22 mole) was mixed with 36.2 grams of dicyclohexylamine (0.2 mole), 100 milliliters of carbon tetrachloride, 200 milliliters of water containing 25 grams of $NaHCO_3$ and 11 grams of $Na_2CO_3$ (as a buffer solution), and 114 milliliters of a solution of NaOCl at 14% by weight in water (0.23 mole). The mix was stirred for 15 minutes at 10° to 15° C. and then allowed to warm to 20° C. 15.2 grams of carbon disulfide (0.2 mole) was added to this mix while maintaining the temperature at 32° to 35° C. The organic layer was separated off and a solid precipitated out by the addition of methanol, which solid was dried to yield the described product.

The following table summarizes the results and yields of each of the experiments described above (according to the methods employed, and calculating the percent yield on the theoretical yield based on the carbon disulfide used).

| Product | Percent Yield Method A | Method B |
|---|---|---|
| 1 | no | 72 |
| 2 | pro- | 92 |
| 3 | duct | 77 |

The foregoing experiments and factual data show that the claimed method (Method B) and the art method (Method A) are not equivalent in their ability to prepare the defined thiocarbamylsulfenamide compounds. The inability of the prior art method to prepare the specific thiocarbamylsulfenamides in the example is attributed to different mechanisms of reaction. In the prior art process a preformed dithiocarbamate is used. It is believed that the claimed process does not proceed through a dithiocarbamate.

In some instances, both the claimed process and the prior art process can be used to prepare a specific thiocarbamylsulfenamide compound. However, on a comparative basis, the claimed process produces significantly higher yields. A fourth experiment was conducted to compare yields obtained using the claimed process and the art process disclosed as experiment 18 on page 939 of the aforementioned article by Smith et al. Using the claimed process, 100 milliliters of chloroform, 34.0 grams of piperidine (0.4 mole), and 116.8 grams of a 13% by weight solution of NaOCl in water (0.2 mole) were mixed together for about 15 minutes in a reactor vessel at a temperature of 0° to 5° C. 15.2 grams (0.2 mole) of carbon disulfide was added to this mix while maintaining the temperature at 10° to 15° C. The mixture was stirred for 20 minutes and then the organic layer separated off and evaporated to yield 46.3 grams of a solid product having a melting point of 94° to 98° C. The infrared spectra of the product was that of the desired product, N,N'-dipiperidinyl thiocarbamylsulfenamide.

Using the claimed method, a yield of 95% of theoretical yield was obtained. This is in contrast to a reported yield of 38% by Smith in experiment 18, method III, on page 939 of the aforementioned article. The claimed process produced a higher yield of product even though it was conducted at (1) a lower temperature (10° – 15° C. versus 35° – 40° C.), and (2) at a lower (substantially equimolar) level of amine to other reactants.

EXAMPLE VII

Thiocarbamylsulfenamides are useful as accelerators for the vulcanization of unsaturated polymers. Three of the prepared compounds were evaluated as accelerators in the sulfur cure of a styrene-butadiene rubber, sold commercially as Ameripol 1502. The recipes and properties measured were:

|  | 1 | 2 | 3 |
|---|---|---|---|
| SBR 1502 | 100 | 100 | 100 |
| HAF Black | 50 | 50 | 50 |
| Stearic Acid | 3 | 3 | 3 |
| Zinc Oxide | 5 | 5 | 5 |
| Sulfur | 2 | 2 | 2 |
| Accelerator A[1] | 1 | | |
| Accelerator B[2] | | 1 | |
| Accelerator C[3] | | | 1 |
| Tensile, psig | 3490 | 3620 | 3780 |
| Percent Elongation | 315 | 360 | 335 |

[1] N,N-dimethyl-N',N'-dicyclo-hexylthiocarbamylsulfenamide
[2] N-oxydiethylene-N', N'-dicyclo-hexylthiocarbamylsulfenamide
[3] N-hexamethylene-N',N'-dicyclohexyl-thiocarbamylsulfenamide The ingredients were incorporated into the rubber using a two-roll mill. The rubber was sheeted, cut and press-cured for 25 minutes at 302° F.

In addition to SBR rubber, accelerators A and B were evaluated in the cure of natural rubber, polybutadiene rubber, and an ethylene-propylene-diene polymer.

I claim:

1. A process for the preparation of thiocarbamylsulfenamides comprising the reaction of, as the only reactants, (1) a monohaloamine of the formula X—A, wherein X is selected from the class consisting of —Cl, —Br, and —I, and A is selected from the group consisting of

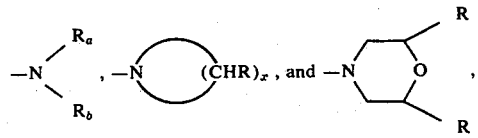

where $R_a$ and $R_b$ are selected from the group consisting of hydrogen, alkyl having 1 to 24 carbon atoms, cyanoalkyl having 2 to 12 carbon atoms, alkoxyalkyl having 2 to 12 carbon atoms total, alkenyl having 2 to 18 carbon atoms, cycloalkyl having 4 to 8 carbon atoms in the ring, phenyl and benzyl; and $x = 4$ to 7, and R is selected from the group consisting of hydrogen and alkyl having 1 to 2 carbon atoms, (2) an amine of the formula H—A, wherein A is defined as above, and (3) carbon disulfide, said reaction conducted at a temperature from about −20° C. to about 100° C. in the presence of a base selected from the group consisting of alkali metal hydroxides, alkali metal alcoholates wherein the alcohol is an aliphatic alcohol containing 1 to 10 carbon atoms and an alkali metal salt of an acid selected from the group consisting of formic acid, acetic acid, citric acid, levulinic acid, benzoic acid, salicylic acid, boric acid, phosphoric acid, and carbonic acid.

2. A process of claim 1 wherein the monohaloamine and the amine are used at essentially 1 mole of each to every one mole of carbon disulfide.

3. A process of claim 1 wherein the monohaloamine and the carbon disulfide are slurried in a water solution of the amine and the base.

4. A process of claim 3 wherein the monohaloamine and the carbon disulfide are dissolved in a chlorinated organic solvent selected from the group consisting of methylene chloride, carbon tetrachloride, chloroform, dichloroethylene, 1,1,1-trichloroethane, 1,1,2-trichloroethane, chlorobenzene, and 1,1,2-trichloro-, 1,2,2-trifluoroethane.

5. A process of claim 4 wherein when A is

$R_a$ is hydrogen or the same as $R_b$, and $R_b$ is selected from the group consisting of alkyl having 1 to 24 carbon atoms and cycloalkyl having 4 to 8 carbon atoms in the ring; and when A is

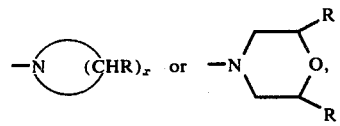

$x$ is 4 to 7 and R is hydrogen or methyl.

6. A process of claim 5 wherein the monohaloamine is a monochloroamine.

7. A process of claim 6 wherein the said monochloroamine is selected from the group consisting of t-butyl-chloroamine, dimethyl-chloroamine, oxydiethyleneamine chloride, 3,5-dimethyl-oxydiethyleneamine chloride, diisopropyl-chloroamine, dicyclohexyl-chloroamine, di-secbutyl-chloroamine, di-(2,2-dimethylethyl)-chloroamine, di-(2-ethylhexyl)-chloroamine, and 2,2,6,6-tetramethylpentamethyleneamine chloride.

8. The process of claim 7 wherein the base is sodium hydroxide and the chlorinated organic solvent is methylene chloride or 1,1,1-trichloroethane.

9. A process of claim 8 wherein the monochloroamine is dimethylchloroamine and the amine is dimethyl amine.

10. A process of claim 8 wherein the monochloroamine is oxydiethyleneamine chloride and the amine is oxydiethyleneamine.

* * * * *